(12) United States Patent
Habassi et al.

(10) Patent No.: US 7,638,472 B2
(45) Date of Patent: Dec. 29, 2009

(54) COMPOSITION FOR CLEANING SOILED ITEMS, NAMELY OPTICAL ITEMS, AND METHOD FOR CLEANING SAID ITEMS

(75) Inventors: Chefik Habassi, Ormesson-sur-Marne (FR); Bernard Parant, Ozoir-la-Ferriere (FR)

(73) Assignee: Essilor International Compagnie Generale d'Optique, Charenton-le-Pont (FR)

( * ) Notice: Subject to any disclaimer, the term of this patent is extended or adjusted under 35 U.S.C. 154(b) by 98 days.

(21) Appl. No.: 10/599,946

(22) PCT Filed: Apr. 12, 2005

(86) PCT No.: PCT/FR2005/050232

§ 371 (c)(1),
(2), (4) Date: Oct. 13, 2006

(87) PCT Pub. No.: WO2005/102644

PCT Pub. Date: Nov. 3, 2005

(65) Prior Publication Data

US 2007/0207935 A1 Sep. 6, 2007

(30) Foreign Application Priority Data

Apr. 13, 2004 (FR) .................................. 04 50730

(51) Int. Cl.
C11D 3/00 (2006.01)
C11D 7/32 (2006.01)
C11D 17/00 (2006.01)
C09D 9/00 (2006.01)
B08B 3/00 (2006.01)
B08B 7/00 (2006.01)

(52) U.S. Cl. ....................... 510/163; 510/164; 510/411; 510/201; 510/206; 510/405; 510/202; 510/212; 510/407; 510/213; 510/413; 510/421; 510/432; 510/108; 510/109; 134/38; 134/39; 134/40; 134/26; 134/29

(58) Field of Classification Search ................. 510/206, 510/405, 201, 202, 212, 407, 163, 164, 411; 134/40, 38–39
See application file for complete search history.

(56) References Cited

U.S. PATENT DOCUMENTS

| | | | | |
|---|---|---|---|---|
| 4,812,255 A * | 3/1989 | Suwala | .......................... | 134/38 |
| 5,106,525 A | 4/1992 | Sullivan | ...................... | 510/206 |
| 5,215,675 A * | 6/1993 | Wilkins et al. | ................ | 510/206 |
| 5,413,729 A * | 5/1995 | Gaul | .......................... | 510/206 |
| 5,427,710 A * | 6/1995 | Stevens | .......................... | 134/1 |
| 5,830,836 A * | 11/1998 | Smith et al. | .................. | 510/212 |
| 5,916,860 A * | 6/1999 | Joye et al. | .................... | 510/201 |
| 5,954,891 A * | 9/1999 | Kondoh et al. | ................. | 134/40 |
| 5,962,383 A * | 10/1999 | Doyel et al. | ................. | 510/164 |
| 6,250,317 B1 * | 6/2001 | Nakayama | ................... | 134/38 |
| 6,423,150 B1 * | 7/2002 | Nakayama | .................... | 134/10 |
| 6,432,544 B1 * | 8/2002 | Stewart et al. | ........... | 428/424.2 |
| 6,608,012 B2 * | 8/2003 | Machac et al. | .............. | 510/212 |
| 6,635,118 B2 * | 10/2003 | Sachdev et al. | ................. | 134/1 |
| 7,588,645 B2 * | 9/2009 | Griese et al. | ................... | 134/38 |
| 2005/0245412 A1 * | 11/2005 | Shah et al. | ................... | 510/201 |
| 2007/0285616 A1 * | 12/2007 | Biver et al. | ................. | 351/177 |

FOREIGN PATENT DOCUMENTS

| GB | 1586471 | | 3/1981 |
|---|---|---|---|
| GB | 2172304 | | 9/1986 |
| JP | 04068095 A | * | 3/1992 |

OTHER PUBLICATIONS

Derwent abstract of JP 04068095 A.*
10599946-264915-EIC 1700 Search -structure/species search result pdf.*

* cited by examiner

*Primary Examiner*—Mark Eashoo
*Assistant Examiner*—Jane L Stanley
(74) *Attorney, Agent, or Firm*—Fulbright & Jaworski L.L.P.

(57) ABSTRACT

Disclosed is a cleaning solution comprising, based on the total weight of the solution: (a) more than 50% by weight of at least one lactone (component A); (b) and 1 to 10% by weight of at least one surfactant compound (component B) having a HLB ranging from 8 to 15 and selected from the group consisting of compounds of formula

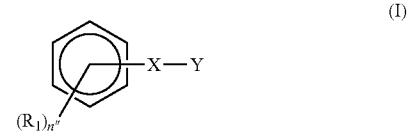

(I)

wherein: $R_1$ denotes a hydrocarbon group comprising from 1 to 20 carbon atoms; n" is an integer from 1 to 5, X denotes a valence link, —O—, —OCH$_2$, C=O or (CH$_2$)$_k$, k being an integer varying from 1 to 2; Y denotes (RO)$_j$H wherein j is an integer ranging from 2 to 40, and R is a divalent hydrocarbon group, and compounds of formula

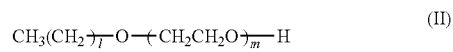

(II)

wherein l is an integer from 6 to 13 and m is an integer from 3 to 15.

32 Claims, No Drawings

COMPOSITION FOR CLEANING SOILED ITEMS, NAMELY OPTICAL ITEMS, AND METHOD FOR CLEANING SAID ITEMS

This application is a national phase application under 35 U.S.C. § 371 of International Application No. PCT/FR2005/050232 filed 12 Apr. 2005, which claims priority to French Application No. 0450730 filed 13 Apr. 2004. The entire text of each of the above-referenced disclosures is specifically incorporated herein by reference without disclaimer.

The present invention generally relates to the cleaning of items soiled by organic material soils and, more particularly to curable or cured materials such as polymerizable or cross-linkable materials or at least partly polymerized or cross-linked materials.

More specifically, the items being aimed at are molds or mold parts used for manufacturing objects made of thermoplastic or thermosetting plastic material such as optical lenses, including ophthalmic lenses and especially mineral glass molds or mold parts used for manufacturing ophthalmic lenses.

Typically, a finished or semi-finished ophthalmic lens made of organic glass is obtained by molding a transparent composition, comprising essentially organic materials in a mold cavity.

The molding composition, which is essentially organic, can be thermoplastic and injected at high temperature under pressure into the mold cavity, i.e. after molding, the resulting solid item consists in a thermoplastic material or it can be a thermosetting composition being introduced as a liquid composition of monomers and/or oligomers by casting in the molding cavity of the mold, and then polymerized and/or cross-linked thermally or by irradiation, including by UV irradiation, to form after molding a thermoset item.

Traditionally, the molds used to manufacture ophthalmic lenses comprise two distinct mold parts, generally made of mineral glass, that are assembled by means of a peripheral joint or an adhesive tape to define a molding cavity. The mold part surfaces defining the molding cavity are "optical" grade surfaces, i.e. surfaces having a suitable geometry and surface condition to confer to the molded lens surfaces having the required geometry and optical grade. The molding composition essentially composed of organic materials is then injected or cast into the mold cavity and then set, for example by solvent removal in the case of the injected thermoplastic materials or by polymerization and/or cross-linking in the case of the thermosetting materials and then the mold parts are dismantled to recover the lens.

After lens demolding and recovering, the molds or mold parts are recovered and cleaned in order to remove the residual materials, including the organic materials remaining on them, and are used again in the molding process.

If the mold is not perfectly cleaned, the lenses being subsequently molded with such mold will exhibit optical defects that should not allow their marketing.

Moreover, such molds or mold parts that are expensive, in particular the molds or mold parts having progressive geometry surfaces defining the molding quality should be able to be reused a very great number of times and the cleaning treatment thus has to minimally alter their surface condition, including their geometry, so as to preserve their lifetime.

The cleaning solution itself should be inexpensive, have a low toxicity and exhibit a sufficient lifetime to be reusable and allow for the treatment of a great number of molds or mold parts.

Different cleaning solutions have been proposed, including in the U.S. Pat. No. 5,954,891 and GB 2,172,304.

The U.S. Pat. No. 5,954,891 discloses a cleaning solution for removing resinous soils comprising an aromatic alcohol and an alkylene oxide compound and optionally an alkali metal hydroxide.

The patent GB 2,172,304 discloses cleaning solutions notably for removal of the thermoplastic material soils, comprising a lactone and possibly an alcohol, including benzyl alcohol. When such a cleaning solution includes an alcohol, the alcohol represents preferably 50 to 90% by weight of the cleaning liquid.

The presence of large quantities of aromatic alcohol, including benzyl alcohol, damages very quickly the cleaned molds, including the molds having complex geometry surfaces, for example molds with a progressive surface, making them unusable after a small number of cleanings.

Thus, an object of the invention is to provide a novel cleaning solution which would be at least as efficient as the prior art solutions, more cost-effective and less contaminating for the environment.

Another object is to provide such a cleaning solution which does not damage the mold quality even after a great number of cleanings and particularly which does not damage the optical surface quality of the molds or mold parts even after a great number of cleanings.

Finally, the invention provides as an object such a cleaning solution with a low hydroxylated aromatic derivatives content, notably benzyl alcohol.

The above aims are reached according to the invention by a cleaning solution which comprises, based on the total weight of the solution:

(A) more than 50% by weight, preferably more than 60% by weight, more preferably more than 70% by weight and most preferably more than 80% by weight of at least one lactone;

(B) at least one surfactant compound having a HLB ranging from 8 to 15.

Preferably, the surfactant B exhibits a HLB ranging from 9 to 14, preferably from 10 to 13.

The hydrophilic-lipophilic ratio (HLB for <<Hydrophilic-Lipophilic Balance>>) is known to those skilled in the art.

This is a dimensionless value accounting for the relative importance of the polar group(s) and the apolar part and which affects the relative affinity of the molecule for water and slightly polar organic media. This value ranges from 0 to 20.

The HLB can be determined by various methods, for example HLB=H/5, H being the mass percentage of the hydrophilic part of the molecule.

Or $HLB=20[1-(I_s/I_a)]$ in the case of the ethoxylated fatty acids, $I_s$ being the saponification number of the non-ionic, $I_a$ being the acid number of the fatty acid.

The HLB can also be determined as the sum of structural factors, each group of the molecule contributing to the elaboration of the HLB (Davies Method).

In that case, $HLB=7+\Sigma(\text{hydrophilic group})-\Sigma(\text{lipophilic group})$.

Preferably, the surfactant B comprises at least one free hydroxy group.

The more particularly recommended surfactants B are non ionic and comprise polyoxyethylene groups.

Preferred surfactants B have the formula:

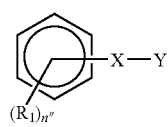
(I)

wherein:

$R_1$ denotes a hydrocarbon group, preferably an alkyl group, comprising from 1 to 20 carbon atoms, more preferably from 5 to 15 carbon atoms, most preferably from 7 to 15 carbon atoms;

n" is an integer from 1 to 5, preferably n" equals 1;

X denotes a valence link, —O—, —OCH$_2$, C=O or (CH$_2$)$_k$, k being an integer varying from 1 to 2;

Y denotes (RO)$_j$H wherein j is an integer ranging from 2 to 40, preferably from 2 to 20, more preferably from 4 to 15 and most preferably from 6 to 12.

R is a divalent hydroxycarbon group, preferably an alkylene group comprising from 1 to 4 carbon atoms, preferably having 2 carbon atoms.

Preferably, the preferred surfactant B has the formula:

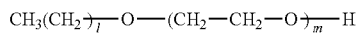

wherein:

l is an integer from 6 to 13, m is an integer from 3 to 15.

Preferably, the component C has the formula:

wherein:

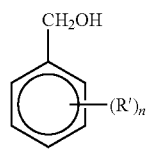

n denotes an integer from 0 to 5, preferably 0 or 1;

R' denotes an alkyl group, preferably having from 1 to 5 carbon atoms; or

R' denotes an alkoxy group —[O-Z]-$_{n'}$H, a formula wherein Z depicts a divalent alkyl group, preferably having from 2 to 4 carbon atoms;

preferably R' depicts an alkyl group;

n' is an integer from 0 to 10.

Preferably, the cleaning solution according to the invention comprises 85% by weight of the total weight of at least one lactone.

Preferably, the cleaning solution comprises, based on the total weight of the solution, from 1 to 10%, preferably from 2 to 5% by weight of s surfactant B.

Preferably, the component (C) of the inventive cleaning solution is a substituted or not substituted benzyl alcohol, preferably benzyl alcohol.

Preferably, the component (C) comprises from 0.1 to 20% by weight and more preferably from 2 to 10% by weight of the total solution weight.

Also preferably, the component (B) of the inventive cleaning solution is selected from compounds of formula (I'):

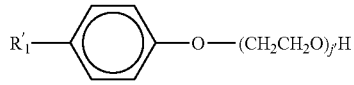
(I')

wherein R'$_1$ is a C$_5$-C$_{10}$ alkyl moiety and j' is an integer from 5 to 10.

The preferred compounds of the formula (I') are the compounds of the formulas:

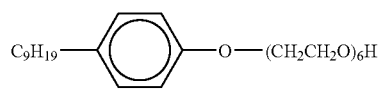
(NP6)

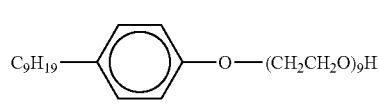
(NP9)

Also preferably, the component (B) comprises a mixture of at least two compounds of the formula (I') and notably compounds NP6 and NP9.

As previously indicated, the main component A of the cleaning solution according to the invention is a lactone or a mixture of lactones, preferably selected from the 4 to 6-membered cyclic esters having an ester functional group —C(O)—O— in their ring and derivatives thereof.

Appropriate lactones for use in the invention include α-angelicalactone, β-propiolactone, γ-butyrolactone, γ-caprylolactone, γ-laurolactone, γ-palmitolactone, γ-stearolactone, γ-crotolactone, γ-valerolactone, δ-valerolactone, γ-caprolactone, δ-caprolactone, γ-gluconolactone and mixtures thereof.

The particularly preferred lactone is butyrolactone.

The cleaning solutions according to the invention can also include an additional component (D) selected from the hydroxyl-free alkyl-substituted aromatic compounds, in particular the compounds of the formula (II):

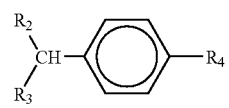
(II)

wherein $R_2$ and $R_3$, being identical or different, are alkyl groups having from 1 to 4 carbon atoms, and $R_4$ is H or an alkyl group having from 1 to 4 carbon atoms.

A preferred compound of the formula (II) is paracymene:

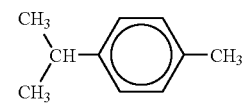

Such additional component(s) (D) can be present up to 10% by weight, preferably up to 8% by weight and more preferably up to 5% by weight based on the total weight of the cleaning solution.

Finally, the cleaning solution according to the invention has a pH generally ranging from 4 to 7.

The invention also relates to a process for cleaning an item soiled by organic materials, including a mold or a mold part, preferably made of mineral glass, and particularly for molding finished or semi-finished lenses, that can have a progressive geometry surface, comprising dipping the soiled item into a cleaning solution as previously defined.

Generally, upon the dipping step, the cleaning solution is at a temperature from 40 to 80° C., typically from 60 to 75° C., and the dipping time is 5 minutes or less.

Preferably, after the dipping step into the cleaning solution according to the invention, the invention process comprises dipping the soiled item into a basic aqueous solution. Generally, such basic aqueous solution comprises from 1 to 10% by weight of alkali hydroxide, preferably potassium hydroxide based on the total weight of the aqueous solution.

The basic aqueous solution can also comprise small amounts of one or more conventional detergent agents such as acids and polyhydroxylated acid alkali salts or aromatic sulfonic acid alkali salts. Examples of such additional detergents include sodium gluconate, dodecylbenzene sulfonic acid and alkali salts thereof and disulfonic acid of diphenyl oxide and alkali salts (DPOS) thereof.

Such detergent agents can represent up to 10% of the weight of the basic aqueous solution, preferably up to 5% thereof.

The basic aqueous solution temperature is generally from 40 to 70° C. and the dipping time in this solution is 5 minutes or less.

Generally, after the dipping in the cleaning solution according to the invention or the basic aqueous solution, if the latter is also used, the cleaned molds or mold parts are rinsed with water generally softened, deionized or distilled water, then dried at a temperature from 80 to 100° C., preferably from 80 to 90° C., for example by air blowing or oven blowing.

The mold or mold part soils can be any organic material traditionally used for molding ophthalmic lenses and including the cured, polymerized and/or cross-linked molding materials resulting from the molding manufacture of such ophthalmic lenses. Such materials can be thermoplastic or thermosetting materials.

The invention also enables to remove coatings with a simple soaking, in particular coatings of the epoxy type (for example Araldite™) used to protect a first optical surface of an item exhibiting two main faces such as a mold, upon the machining of the item second face.

In particular, such materials can be materials resulting from the molding of di(meth)acrylate, in particular bisphenol-A di(meth)acrylate based materials, either polyalkoxylated or not, or even polythiourethane based materials, in particular materials known as MR7 marketed by the Mitsui corporation.

In the case of thiourethane type materials, it is preferable to carry out a pre-washing step with a basic aqueous solution, possibly comprising surfactants, optionally followed by a soaking in a solution comprising an organic solvent such as N-methylpyrrolidone (NMP), acetone and the alcohols.

EXAMPLES 1 TO 12

Cleaning solutions have been prepared according to the teaching of the invention by mixing the indicated raw materials under a slight stirring for 30 min. The cleaning solution compositions according to the invention are given in table 1 below.

Mineral material molds soiled by residues of a poly [bisphenolpoly(alkoxylated)dimethacrylate] based thermosetting material were dipped into cleaning solutions under the cleaning conditions indicated in table 1.

For each of the cleaning solutions provided by way of example, 20 molds have been treated (i.e. 40 mold parts).

The cleaning solutions were stirred at 700 rpm and a temperature of 75° C. (solutions from 1 to 10) or 70° C. (solutions 11 to 12).

The dipping time was 3 minutes in every case.

After removal of the cleaning solution, the molds were dipped for 3 minutes in a basic aqueous solution at 60° C., having the following composition, by weight:

| | |
|---|---|
| Deionized water | 89% |
| 90% KOH aqueous solution | 6% |
| Sodium gluconate | 3% |
| Dodecyl benzene sulfonic acid | 1% |
| Diphenyl oxide disulfonate (DPOS 45) | 1% |

After removal of the molds from the basic aqueous solution, such molds were rinsed with deionized water, and then dried by blowing hot air during 3 minutes and the molds thus cleaned were visually inspected.

The mold inspection after washing was done with a SPOT WALDMAN HPT20 lamp by oblique lighting onto the optical surface of the mold, in a subdued light environment.

The defects were detected by naked eye as being locally more contrasted (more luminous) areas on the optical surface of the mold.

The results of the mold cleanings are indicated in table 2.

TABLE 1

| | LEANING SOLUTIONS (% by weight) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Component A | | | | | | | | | | | | |
| Butyrolactone | 87 | 87 | 87 | 87 | 87 | 87 | 87 | 87 | 87 | 87 | 87 | 87 |
| Component C | | | | | | | | | | | | |
| Benzyl alcohol | — | — | — | — | — | — | 10 | — | — | 5 | — | — |
| Component B | | | | | | | | | | | | |
| NP6 | 1.5 | 1.5 | 1.5 | 1.5 | 1.5 | 1.5 | 1.5 | 1.5 | 1.5 | 1.5 | 1 | 1.5 |
| NP9 | 1.5 | 1.5 | 1.5 | 1.5 | 1.5 | 1.5 | 1.5 | 1.5 | 1.5 | 1.5 | 1 | 1.5 |

TABLE 1-continued

| | LEANING SOLUTIONS (% by weight) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Component D | | | | | | | | | | | | |
| Cumene | — | — | — | — | — | — | — | 10 | — | — | 10 | — |
| Paracymene | — | — | — | — | — | — | — | — | 10 | 5 | — | 10 |
| Solvents | | | | | | | | | | | | |
| Cyclohexanone | 10 | — | — | — | — | — | — | — | — | — | — | — |
| DMSO | — | 10 | — | — | — | — | — | — | — | — | — | — |
| Diacetone alcohol | — | — | 10 | — | — | — | — | — | — | — | — | — |
| Methylisopropylketone | — | — | — | 10 | — | — | — | — | — | — | — | — |
| NMP | — | — | — | — | 10 | — | — | — | — | — | — | — |

DMSO: Dimethylsulfoxide
NMP: N-methylpyrrolidone
—: means that the corresponding product is not present in the formulation.

TABLE 2

| Cleaning solution | Cleaning quality |
|---|---|
| 1 | − |
| 2 | − |
| 3 | − |
| 4 | − |
| 5 | − |
| 6 | − |
| 7 | − |
| 8 | + |
| 9 | + |
| 10 | ++ |
| 11 | − |
| 12 | + |

− means acceptable cleaning: at least 80% of the molds do not exhibit any defect upon the previously described visual inspection test.
+ means good cleaning: at least 95% of the molds don't exhibit defects anymore upon the visual inspection test.
++ means good cleaning/flash released in 25 seconds.
(flash: polymer résidues which are under the form of aggregates distributed on the edge of the mold parts)

The invention claimed is:

1. A cleaning solution consisting of, based on the total weight of the solution:
   more than 50% by weight of at least one lactone (component A);
   1 to 10% by weight of at least one surfactant compound (component B) having a HLB ranging from 8 to 15 and selected from the group consisting of compounds of formula:

$$\underset{(R_1)_{n''}}{\underset{|}{\text{Ph}}}-X-Y \quad (I)$$

wherein:
R$_1$ denotes a hydrocarbon group comprising from 1 to 20 carbon atoms;
n″ is an integer from 1 to 5,
X denotes a valence link, —O—, —OCH$_2$, C=O or (CH$_2$)$_k$, k being an integer varying from 1 to 2;
Y denotes (RO)$_j$H wherein j is an integer ranging from 2 to 40, and
R is a divalent hydrocarbon group, and compounds of formula:

$$CH_3(CH_2)_{\overline{l}}-O-(CH_2CH_2O)_{\overline{m}}-H, \quad (II)$$

wherein l is an integer from 6 to 13 and m is an integer from 3 to 15; and
at least another component selected from:
   a component C of formula:

$$\underset{(R')_n}{\underset{|}{\text{Ph}}}-CH_2OH$$

wherein:
n denotes an integer from 0 to 5, and
R' is an alkyl group or an alkoxy group —[O-Z]$_{n'}$-H in which Z is a divalent alkyl group and n' is an integer from 0 to 10, and
a component D of formula:

$$\underset{R_3}{\overset{R_2}{\diagdown}}CH-\text{Ph}-R_4$$

wherein:
R$_2$ and R$_3$, being identical or different, are alkyl groups having from 1 to 4 carbon atoms, and
R$_4$ is H or an alkyl group having from 1 to 4 carbon atoms.

2. The cleaning solution of claim 1, further defined as comprising, based on the total weight of the solution, at least 60% by weight of the at least one lactone.

3. The cleaning solution of claim 2, further defined as comprising, based on the total weight of the solution, at least 70% by weight of the at least one lactone.

4. The cleaning solution of claim 3, further defined as comprising, based on the total weight of the solution, at least 80% by weight of the at least one lactone.

5. The cleaning solution of claim 1, wherein n is 0 or 1.

6. The cleaning solution of claim 1, wherein R' is an alkyl group having from 1 to 5 carbon atoms.

7. The cleaning solution of claim 1, further defined as comprising, based on the total weight of the solution, from 0.1 to 20% by weight of component C.

8. The cleaning solution of claim 1, further defined as comprising, based on the total weight of the solution, from 2 to 10% by weight of component C.

9. The cleaning solution of claim 1, wherein component C is benzyl alcohol.

10. The cleaning solution of claim 1, wherein the hydrocarbon group $R_1$ comprises from 5 to 15 carbon atoms.

11. The cleaning solution of claim 1, wherein the hydrocarbon group $R_1$ comprises from 7 to 15 carbon atoms.

12. The cleaning solution of claim 1, wherein n" equals 1.

13. The cleaning solution of claim 1, wherein j is an integer from 2 to 20.

14. The cleaning solution of claim 1, wherein j is an integer from 4 to 15.

15. The cleaning solution of claim 1, wherein j is an integer from 6 to 12.

16. The cleaning solution of claim 1, wherein the divalent hydrocarbon group R has 2 carbon atoms.

17. The cleaning solution of claim 1, wherein the at least one surfactant (component B) has the formula:

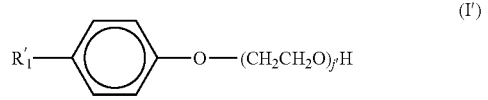
(I')

wherein $R'_1$ is a $C_5$-$C_{10}$ alkyl moiety and j' is an integer from 5 to 10.

18. The cleaning solution of claim 17, wherein the at least one surfactant comprises:

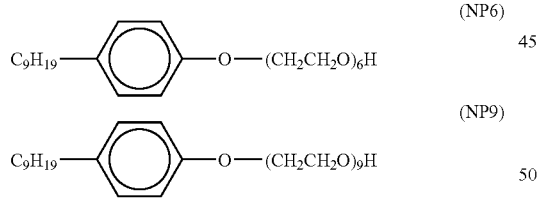

or a mixture thereof.

19. The cleaning solution of claim 1, wherein the lactone is a 4 to 6-membered cyclic ester having an ester functional group —C(O)—O— in its ring or a derivative thereof.

20. The cleaning solution of claim 19, wherein the at least one lactone is further defined as α-angelicalactone, β-propiolactone, γ-butyrolactone, γ-caprylolactone, γ-laurolactone, γ-palmitolactone, γ-stearolactone, γ-crotolactone, γ-valerolactone, δ-valerolactone, γ-caprolactone, δ-caprolactone, or γ-gluconolactone.

21. The cleaning solution of claim 1, wherein component D comprises up to 10% by weight of the cleaning solution.

22. The cleaning solution of claim 1, wherein component D comprises up to 8% by weight of the cleaning solution.

23. The cleaning solution of claim 1, further defined as having a pH from 4 to 7.

24. A process for cleaning an item soiled by organic materials, comprising dipping the soiled item into a cleaning solution consisting of, based on the total weight of the solution:
more than 50% by weight of at least one lactone (component A);
1 to 10% by weight of at least one surfactant compound (component B) having a HLB ranging from 8 to 15 and selected from the group consisting of compounds of formula:

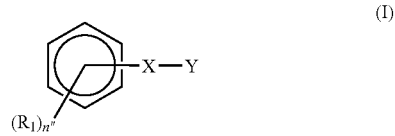
(I)

wherein:
$R_1$ denotes a hydrocarbon group comprising from 1 to 20 carbon atoms;
n" in an integer from 1 to 5,
X denotes a valence link, —O—, —OCH$_2$, C=O or (CH$_2$)$_k$, k being an integer varying from 1 to 2;
Y denotes (RO)$_j$H wherein j is an integer ranging from 2 to 40, and
R is a divalent hydrocarbon group,
and compounds of formula:

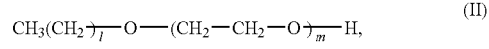
(II)

wherein l is an integer from 6 to 13 and m is an integer from 3 to 15; and
at least another component selected from:
a component C of formula:

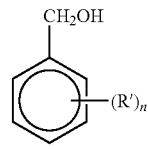

wherein:
n denotes an integer from 0 to 5, and
R' is an alkyl group or an alkoxy group —[O-Z]$_{n'}$-H in which Z is a divalent alkyl group and n' is an integer from 0 to 10, and
a component D of formula:

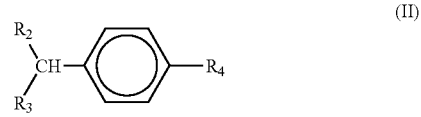
(II)

wherein:
$R_2$ and $R_3$, being identical or different, are alkyl groups having from 1 to 4 carbon atoms, and $R_4$ is H or an alkyl group having from 1 to 4 carbon atoms.

25. The cleaning process of claim 24, wherein the cleaning solution is at a temperature ranging from 40 to 80° C. at the time of dipping.

26. The cleaning process of claim 24, wherein the dipping time is 5 minutes or less.

27. The cleaning process of claim 24, further comprising, after the dipping step of the soiled item into the cleaning solution, dipping the item into a basic aqueous solution comprising from 1 to 10% by weight of potassium hydroxide based on the total weight of the aqueous solution.

28. The cleaning process of claim 24, wherein the item is soiled by a thermosetting material.

29. The cleaning process of claim 24, wherein the item is made of mineral glass.

30. The cleaning process of claim 24, wherein the item is a mold for optical lenses.

31. The cleaning process of claim 24, wherein the item is a mold for ophthalmic lenses.

32. The cleaning process of claim 24, wherein the item has a progressive geometry surface.

* * * * *